Figure 1:
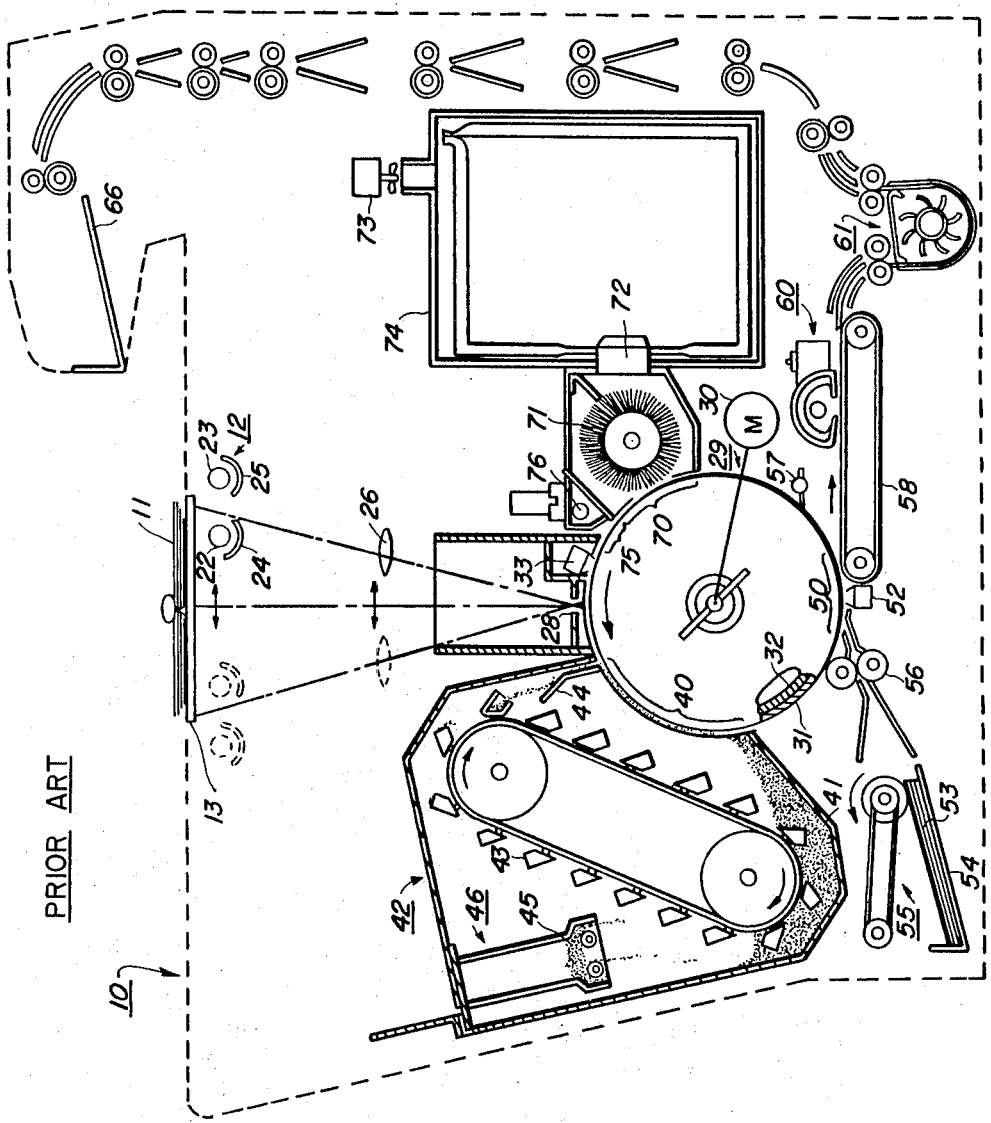

United States Patent [19]
Brooke

[11] 3,858,976
[45] Jan. 7, 1975

[54] OPTICAL SCANNING SYSTEM

[76] Inventor: Edric Raymond Brooke, 3 Densley Close, Welwyn Garden City, England

[22] Filed: Feb. 25, 1974

[21] Appl. No.: 445,529

[52] U.S. Cl. .................................................. 355/66
[51] Int. Cl. .................................................. G03b 27/70
[58] Field of Search ............................ 355/8, 65, 66

[56] References Cited
UNITED STATES PATENTS
3,649,126  3/1972  Koizumi................................. 355/8

FOREIGN PATENTS OR APPLICATIONS
2,237,761  3/1973  Germany ............................... 355/8

*Primary Examiner*—John M. Horan
*Attorney, Agent, or Firm*—James J. Ralabate; Clarence A. Green; Paul Weinstein

[57] ABSTRACT

A scanning system for a photocopying apparatus including at least three moving mirrors. A first moving mirror is provided which is inclined to the platen and moves at a first speed to scan an original. A second moving mirror is provided which receives the reflected light from the first moving mirror and moves at a second speed different from that of the first mirror. A third moving mirror is provided which receives the light reflected from the second mirror and moves at a speed which is different from that of the first mirror. The second and third moving mirrors move in different directions. The mirrors are movable in synchronism with one another and the speeds are selected to maintain the optical path constant. A lens is provided to receive the light reflected from the third mirror and project it to a moving photosensitive surface.

8 Claims, 2 Drawing Figures

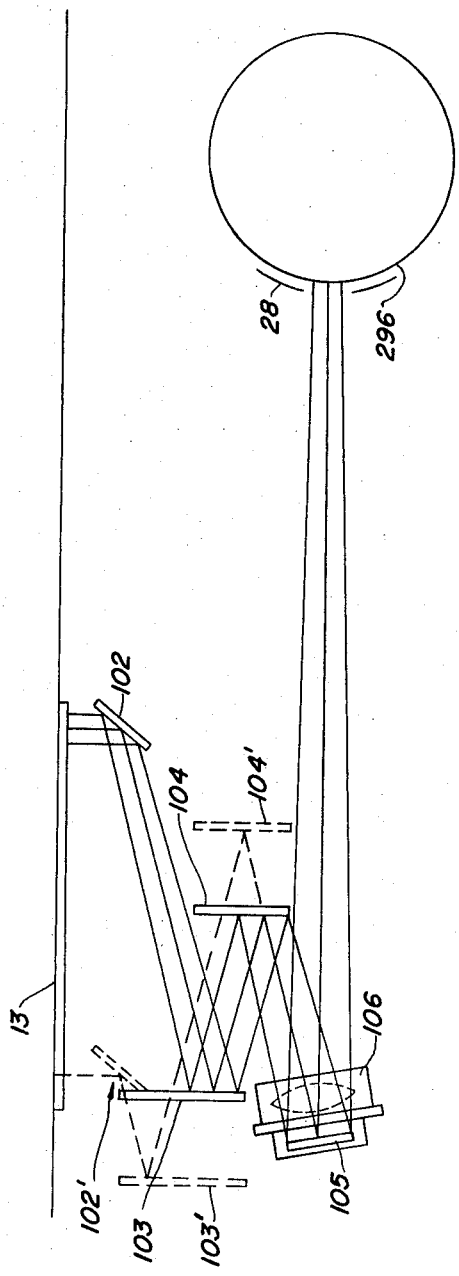

OPTICAL SCANNING SYSTEM

This invention relates to a scanning optical system for a photocopying apparatus.

When areas of a document on a transparent platen are projected successively onto a moving photosensitive surface, it is necessary to ensure that the image of the area on the document being projected remains focused on the surface. This has been achieved in earlier apparatus, for example disclosed in U.S. Pat. No. 3,614,222, where the optical path from the document to the photosensitive surface is folded by means of mirrors aligned with the length of the transverse strip being scanned on the document, and all but the first mirror arranged at right-angles to the direction of scan. In that apparatus, one mirror is moved at a different speed to the other mirrors in order to retain the focusing of the image on the photosensitive surface as the document is scanned.

According to the present invention, there is provided a photocopying apparatus for reproduction of a stationary original on a moving photosensitized surface by progressively scanning the surface of the original and directing the scanning beam to a fixed exposure area, the apparatus having in the scanning optical system four mirrors some of which are movable relative to the others; such that the optical distance of successive scanned areas from the exposure area to the photosensitive surface remains constant as the first mirror scans across the platen.

In U.S. Pat. No. 3,614,222, there is an odd number of mirrors.

An example of the invention will now be described with reference to the accompanying drawings, in which:

FIG. 1 is a schematic section elevation of photocopying apparatus incorporating a conventional document scanning system, and FIG. 2 is a schematic diagram of a document scanning system according to the present invention.

For a general understanding of the xerographic processing system reference is made to FIG. 1 in which the various system components are schematically illustrated.

It should be understood that xerographic machines can include other forms of these components. The xerographic apparatus described herein may be an adaptation of the type disclosed in Eichler et al., U.S. Pat. No. 2,945,434. As in all xerographic systems based on the concept disclosed in U.S. Pat. No. 2,945,434, a radiation image of copy to be reproduced is projected onto the sensitized surface of a xerographic plate forming an electrostatic latent image thereon. Thereafter, the latent image is usually developed with an electroscopically charged developing material to form a xerographic powder image, corresponding to the latent image on the plate surface. The developed image is then transferred to a support surface to which the image is permanently affixed by means of a fuser apparatus.

As shown in FIG. 1 there is illustrated a light-tight cabinet 10 for enclosure and containment of all the operative components. Copy to be reproduced, such as a book, sheet or the like, here designated 11, is supported at a copy station 12. The copy station includes a horizontally arranged transparent platen support 13 such as glass, on which the copy rests in position to be optically scanned. Projection of the copy image is achieved by means of a scanning mechanism that in this embodiment includes a pair of transversely extending fluorescent lights 22 and 23 that are adapted to move horizontally from the position shown solid to the position shown dashed as more fully described in the above-cited Eichler patent. Light shields 24 and 25 prevent stray light from being transmitted from the lamps other than that which is utilized for illuminating the copy above. An image of the illuminated copy is reflected through objective lens 26, which moves horizontally in conjunction with the lamp, for projecting an image downwardly through an aperture slit 28 and onto the surface of a xerographic plate which in this embodiment is in the form of rotating drum 29.

Xerographic drum 29 includes a cylindrical member mounted in suitable bearings in the frame of the machine and is driven in a counterclockwise direction by a motor 30 at a constant rate that is proportional to the scanning rate of the copy, whereby the peripheral rate of the drum surface is identical to the scan rate of the reflected light image. The drum surface comprises a layer of photoconductive insulating material 31, which may, for example, be vitreous selenium, supported on a conductive backing 32, such as aluminum. Prior to exposure, the drum surface is sensitized by means of a corona generating device 33, which may be an adaptation of the type disclosed in Vyverberg U.S. Pat. No. 2,965,756 and which is energized from a suitable high potential source (not shown).

The exposure of the drum to the light image discharges the photoconductive surface in the areas struck by light whereby there remains on the drum a latent electrostatic image in image configuration corresponding to the light image projected from the copy. As the drum surface continues its movement, the electrostatic latent image passes through a developing station 40 in which a two-component (toner and carrier) developing material 41, which may be the type disclosed in U.S. Pat. No. 2,638,416, is cascaded over the drum surface by means of a developing apparatus 42.

In the developing apparatus, the two-component developing material 41 is carried upwardly by conveyor 43 driven by suitable drive means and released onto chute 44 wherefrom it cascades down over the drum surface effecting development of the latent image thereon. Toner component 45 or the developer that is consumed in developing is stored in dispenser 46 and is released in amounts as controlled by the dispensing mechanism.

After developing, the powder image passes through an image transfer station 50 at which the powder image is transferred by means of a second corona generating device 33 mentioned above, to a sheet of copy paper 53. The copy sheets are arranged in stack form on a supply tray 54 and are fed therefrom individually by means of a mechanical feeder 55 adapted to feed the top sheet of the stack through driven feed rollers 56 which direct the sheet material into contact with the rotating drum in coordinated registration with the arrival of the developed image at the transfer station.

Following transfer, a pick-off mechanism 57 ensures removal of the copy sheet from the drum surface wherefrom the copy sheet is directed onto an endless conveyor 58 whereby the copy sheet is carried past the fusing and cleaning devices of the invention respectively and designated as 60 and 61. The image is permanently affixed thereat by the fuser onto the copy sheet. Thereafter, the finished copy passes through further feed rolls into a vertical conveying system 65 by means of which the copy is delivered to a copyholder 66 supported along the top portion of cabinet 10 from where it may conveniently be removed by an operator.

After transfer, the xerographic drum surface passes through a cleaning station 70 at which the surface is brushed by cleaning brush assembly 71, whereby residual developing material remaining on the drum surface is removed. The powder removed from the drum surface is exhausted through port 72 by means of suction provided from fan 73 and becomes lodged in a removable filter bag 74. The drum surface then passes through a discharge station 75 at which it is illuminated by a fluorescent lamp 76 whereby the drum surface in this region is completely flooded with light to remove any electrostatic charge that may remain thereon. Suitable light traps are provided in the system to prevent any light rays from reaching the drum surface other than the projected image, during the period of drum travel immediately prior to sensitization by corona generating device 33 until after the drum surface is completely passed through the developing station 40.

It can be seen that the volume swept up by the light rays from the platen 13 to the exposure slit 28 is very large, requiring a very large cabinet for the apparatus. In FIG. 2, the optical path of the light beam from the platen 13 to the drum 29 is folded four times by four mirrors. FIG. 2 does not show lamps for illuminating the document on the platen, and this may take the form of the lamps 22 and 23 of FIG. 1 which are scanned across the underside of the platen, or the whole underside of the platen may be illuminated during exposure, as is disclosed in U.S. Pat. No. 3,512,885.

In FIG. 2, the optical path between portions of the platen at each end of the scanning path and the drum 29 is traced out, one in dashed lines and the other in full lines. The corresponding positions of the mirrors are shown in dashed and full lines. Light rays projected downwardly from the platen are first reflected from a small first mirror 102 extending across the width of the platen 3 and inclined at about 40° to the platen normal line. This mirror is moved smoothly across and parallel to the underside of the platen at a first speed during the scanning stroke, and is then returned to its start of scan position at the end of the exposure phase. Light from the first mirror 102 is reflected onto a second parallel moving mirror 103 which is movable at a second speed different from the first speed and which is positioned normal or perpendicular to the platen and extends across the width of the platen. Light reflected from the second mirror is then reflected from a third parallel moving mirror 104, which is movable at a third speed different from the first speed and which is also positioned normal to the platen and extends across the width of the platen. Light from the third mirror passes through a lens system 106 and onto a fourth mirror 105 which is inclined slightly to the platen normal. Light reflected from the fourth mirror passes back through the lens system and falls onto the drum 29, passing through an exposure slit 28.

In the particular embodiment described with reference to FIG. 2, the second and third mirrors are linearly movable in synchronism with the first mirror, and the fourth mirror in stationary. The second mirror moves in the same direction as the first mirror at, for example, one-fourth of its velocity and the third mirror moves in the opposite direction to the first mirror also at one-fourth of its speed. It is, however, possible for the mirrors to move at other relative speeds, provided that the optical path between the platen and the drum remains of constant length. With the particular ½ lens system illustrated in FIG. 2, where the light passes through the lens system twice, it would be difficult to maintain focusing of the image on the drum if the fourth mirror and/or the lens were to move. However, if a conventional lens were located only in the path between the fourth mirror and the drum, it would be possible for the fourth mirror to move.

The drive mechanism for the mirrors has not been described, since any conventional drive arrangement could be used. In order to ensure proper focusing of the image on the drum it should be arranged that the drive to the mirrors and the drum should be in synchronism.

All patents heretofore referred to are specifically incorporated by reference into this application.

It is apparent that there has been provided in accordance with this invention a scanning apparatus which fully satisfies the objects, means and advantages set forth hereinbefore. While the invention has been described in conjunction with specific embodiments therefore it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In an apparatus wherein an original document is supported in a plane upon a platen and wherein means are provided along an optical path for progressively scanning the original and for projecting the light from successive scanned areas upon a moving photosensitive surface, the improvement wherein said scanning means comprises a compact optical scanning system including:

a first moving mirror inclined to said platen, said first mirror moving at a first speed to scan said original, said first mirror receiving said light from said successively scanned areas of said original;

a second moving mirror oriented normal to said platen and positioned to receive light reflected from said first moving mirror, said second mirror moving at a second speed different from said first speed;

a third moving mirror oriented normal to said platen and positioned to receive light reflected from said second moving mirror, said third mirror moving at a third speed different from said first speed, said third mirror moving in a direction substantially opposed from that of said second mirror;

said mirrors being positioned on one side of the plane of said platen and being movable in synchronism with one another, and the respective speeds of said mirrors being selected to maintain a constant length for the optical path between said platen and said moving photosensitive surface; and a lens positioned to receive light reflected from said third mirror.

2. An apparatus as in claim 1 wherein said first mirror scans parallel to said platen.

3. An apparatus as in claim 1 wherein said second and third mirrors move at the same speed.

4. An apparatus as in claim 3 wherein said speed of each of said second and third moving mirrors comprises one-quarter of the speed of said first moving mirror.

5. An apparatus as in claim 4 wherein all of said mirrors move parallel to said plane of said original.

6. An apparatus as in claim 5 wherein said first speed is the same as the surface speed of said moving photosensitive surface.

7. An apparatus as in claim 6 wherein said lens comprises a stationary half-lens, said half-lens comprising a lens means and a mirror positioned to reflect light received by the lens means through the lens means.

8. An apparatus as in claim 7 wherein said second mirror scans in the same direction as said first mirror.

* * * * *

UNITED STATES PATENT OFFICE
CERTIFICATE OF CORRECTION

Patent No. 3,858,976　　　　　　　Dated January 7, 1975

Inventor(s) Edric Raymond Brooke

It is certified that error appears in the above-identified patent and that said Letters Patent are hereby corrected as shown below:

Page 1, after the name and address of the inventor, insert:

--[73] Assignee: Xerox Corporation, Stamford, Conn.--

Signed and Sealed this second Day of March 1976

[SEAL]

Attest:

RUTH C. MASON
*Attesting Officer*

C. MARSHALL DANN
*Commissioner of Patents and Trademarks*